Patented May 24, 1938

2,118,662

UNITED STATES PATENT OFFICE 2,118,662

PRODUCTION OF ETHYL CHLORIDE

Walter Baumann, Leuna, and Joseph Hirschbeck, Ludwigshafen-on-the-Rhine, Germany, assignors to I. G. Farbenindustrie Aktiengesellschaft, Frankfort-on-the-Main, Germany No Drawing. Application January 8, 1937, Serial No. 119,622. In Germany January 16, 1936

6 Claims. (Cl. 260—166)

The present invention relates to the production of ethyl chloride.

In the hydrogenation of unsaturated halogen-hydrocarbons it is not usually possible to obtain the corresponding saturated halogen-hydrocarbons, but on the contrary halogen is split off during the reaction. The reason for this is to be sought in the readiness with which the usual hydrogenation catalysts are poisoned by halogen compounds on the one hand and in the great tendency to form hydrogen halides on the other hand.

We have now found that, contrary to expectation, ethyl chloride can be obtained in good yields by causing vinyl chloride to react with an excess of hydrogen at elevated temperatures in the presence of catalysts, if desired under increased pressure.

The hydrogenation of vinyl chloride is aggravated by various side reactions. Undesirable products are thereby formed which reduce the yield of ethyl chloride and injure the catalysts used in the hydrogenation. The higher the reaction temperature and the longer the period for which the mixture of vinyl chloride and hydrogen is exposed to the action of the catalyst, the more are such side reactions favored. The cause of this is to be sought partly in the strongly exothermic character of the hydrogenation reaction and partly in the ease with which vinyl chloride is decomposed into acetylene and hydrogen chloride and with which ethyl chloride is decomposed into ethylene and hydrogen chloride and finally in the tendency of vinyl chloride to polymerize. The unsaturated substances formed by the side-reactions can, in part, be hydrogenated especially readily whereby the maintenance of a definite reaction temperature is rendered difficult because frequently the temperature rises suddenly and causes an entirely undesirable course of the reaction.

According to this invention vinyl chloride can be hydrogenated especially advantageously and while avoiding the said difficulties by causing a mixture of vinyl chloride and hydrogen to react at only moderately elevated temperature, the mixture only containing small amounts, advantageously less than 20 per cent and preferably even only 10 per cent or less, of vinyl chloride. Furthermore it is preferable to lead the mixture of vinyl chloride and hydrogen over the catalyst so rapidly that only about one half or less of the vinyl chloride is converted. After the mixture has passed through the reaction chamber, it is cooled, the ethyl chloride is separated from the vinyl chloride by distillation and the vinyl chloride mixed with hydrogen and returned to the reaction chamber again. The separation of the reaction mixture into its components may also be effected only partly; in this case a portion of the ethylchloride formed is returned to the reaction chamber together with the vinyl chloride.

The reaction is preferably carried out at temperatures between 50° and 200°, advantageously between 80° and 100° C. The use of pressures up to 200 atmospheres or more, in particular between 20 and 50 atmospheres, has proved advantageous. Contrary to expectation no polymerization of the vinyl chloride takes place even under increased pressure, under the said conditions. Furthermore working under pressure considerably facilitates the separation of the mixture of vinyl chloride and ethyl chloride from the reaction gas and at the same time permits of the use of water at ordinary temperature as the cooling agent.

Suitable catalysts are the metals usually employed in hydrogenations. Most suitable are metals of the 8th group of the periodic system, in particular precious metals of this group, especially palladium and platinum. Other metals, as for example zinc or nickel, and also metal compounds, such as calcium hydride, are however, also suitable as catalysts.

The catalysts are preferably employed in fine distribution on carriers, as for example masses having fine pores, such as silica or alumina gels, active carbon and the like. It is preferable to apply the catalyst in such thin layers that the catalysts used contain only about 1 per cent or less of the active substance.

By maintaining the said reaction conditions it is possible with repeated reaction of the vinyl chloride remaining unchanged to obtain total yields of from 80 to 90 per cent or more and in the most favorable cases up to 96 per cent of ethyl chloride.

The following examples will further illustrate how this invention may be carried out in practice but the invention is not restricted to these examples.

Example 1

A mixture of 90 per cent of hydrogen and 10 per cent of vinyl chloride vapor is led at 120° C. over a catalyst which contains such an amount of nickel applied to alumina gel that the content of nickel amounts to 36 per cent of the total catalyst. The speed of the mixture of hydrogen and vinyl chloride is so adjusted that 220 times the volume of the catalyst thereof flow through the reaction chamber per hour. After one passage of the gas mixture, 60 per cent of the vinyl chloride remain unchanged; of the vinyl chloride which has been converted, 80 per cent are converted into ethyl chloride.

*Example 2*

The catalyst consists of silica gel on which palladium has been precipitated so that there is a total content of 0.1 per cent of palladium. 400 times the volume of the said catalyst of a mixture containing 91 per cent of hydrogen and 9 per cent of vinyl chloride vapor are led continuously over the catalyst per hour at 85° C. After flowing through the reaction chamber, the major portion of the vinyl chloride and ethyl chloride contained in the reaction mixture is separated from the gas stream by strong cooling, whereby 46 per cent of the vinyl chloride employed are recovered unchanged. The unconverted vinyl chloride is separated by rectifying distillation from the mixture obtained by condensation and led over the catalyst again in the same way with the gas stream. The residual ethyl chloride is purified by distillation.

The total yield of ethyl chloride in this process amounts to 85 per cent of the vinyl chloride employed.

*Example 3*

A mixture consisting of 92 per cent of hydrogen and 8 per cent of vinyl chloride vapor is led at 90° C. under a pressure of 50 atmospheres over the catalyst described in Example 2 at such a speed that the gas mixture remains in contact with the catalyst for 8.5 seconds. When the reaction mixture leaves the reaction chamber, 52 per cent of the vinyl chloride employed have been converted, 90 per cent of the converted vinyl chloride being converted into ethyl chloride. The remainder of the vinyl chloride is unchanged. The mixture of vinyl chloride and ethyl chloride is condensed from the reaction mixture under pressure by cooling with water at ordinary temperature. The mixture is separated by rectifying distillation and further worked up as described in Example 2.

What we claim is:—

1. A process for the production of ethyl chloride which comprises bringing a gaseous mixture of hydrogen and up to 20 per cent of vinyl chloride into contact with a hydrogenation catalyst at temperatures from about 50 to 200° C. the speed of flow being so chosen that at most about one half of the vinyl chloride is converted.

2. A process for the production of ethyl chloride which comprises bringing a gaseous mixture of vinyl chloride and hydrogen which contains at most 10 per cent of vinyl chloride into contact with a hydrogenation catalyst under superatmospheric pressure and at temperatures from about 50 to 200° C. the speed of flow being so chosen that at most about one half of the vinyl chloride is converted.

3. A process for the production of ethyl chloride which comprises bringing a gaseous mixture of vinyl chloride and hydrogen which contains at most 10 per cent of vinyl chloride into contact with a hydrogenation catalyst under a pressure between 20 and 50 atmospheres and at temperatures from about 50 to 200° C. the speed of flow being so chosen that at most about one half of the vinyl chloride is converted.

4. A process for the production of ethyl chloride which comprises bringing a gaseous mixture of vinyl chloride and hydrogen which contains at most 10 per cent of vinyl chloride into contact with a hydrogenation catalyst deposited on a porous carrier at temperatures from about 50 to 200° C. the speed of flow being so chosen that at most about one half of the vinyl chloride is converted.

5. A process for the production of ethyl chloride which comprises leading a gaseous mixture of vinyl chloride and hydrogen which contains at most 10 per cent of vinyl chloride over a hydrogenation catalyst at temperatures from about 50 to 200° C. the speed of flow being so chosen that at most about one half of the vinyl chloride is converted.

6. A continuous process for the production of ethyl chloride which comprises continuously leading a gaseous mixture of vinyl chloride and hydrogen which contains at most 10 per cent of vinyl chloride over a hydrogenating catalyst at temperatures from 50 to 200° C., the speed of flow being so chosen that at most about one half of the vinyl chloride is converted, and removing continuously the ethyl chloride formed from the reaction mixture.

WALTER BAUMANN.
JOSEPH HIRSCHBECK.